US012750655B2

(12) United States Patent
Khanvilkar et al.

(10) Patent No.: US 12,750,655 B2
(45) Date of Patent: Sep. 29, 2026

(54) SYSTEMS AND METHODS FOR ALLOCATING A NETWORK IDENTIFIER FOR A BOOTSTRAP PROFILE OF A USER EQUIPMENT

(71) Applicant: Verizon Patent and Licensing Inc., Basking Ridge, NJ (US)

(72) Inventors: Utpal Khanvilkar, Basking Ridge, NJ (US); John Sangem, Whippany, NJ (US); Niranjan R. Samant, Lansdale, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 261 days.

(21) Appl. No.: 18/751,726

(22) Filed: Jun. 24, 2024

(65) Prior Publication Data

US 2025/0392900 A1 Dec. 25, 2025

(51) Int. Cl.
*H04W 8/18* (2009.01)

(52) U.S. Cl.
CPC .................................... *H04W 8/18* (2013.01)

(58) Field of Classification Search
CPC ....................................................... H04W 8/18
See application file for complete search history.

(56) References Cited

U.S. PATENT DOCUMENTS

2021/0044960 A1 * 2/2021 Bouskila .............. H04W 76/10

* cited by examiner

*Primary Examiner* — Curtis B Odom

(57) ABSTRACT

A device may store a plurality of network identifiers associated with a network, and may allocate, from the plurality of network identifiers, a network identifier to a bootstrap profile of a user equipment upon detection of an attachment of the user equipment to the network. The device may update a network device of the network with the allocated network identifier for the bootstrap profile, and may initiate transmission of the allocated network identifier to the user equipment. The device may quarantine the network identifier associated with the bootstrap profile based on the bootstrap profile being disabled.

20 Claims, 8 Drawing Sheets

SYSTEMS AND METHODS FOR ALLOCATING A NETWORK IDENTIFIER FOR A BOOTSTRAP PROFILE OF A USER EQUIPMENT

BACKGROUND

User equipment (UEs) using subscriber identity modules (SIMs) or embedded universal integrated circuit cards (eUICCs) require a bootstrap profile that enables the UEs to connect to a wireless network and to access network services.

DETAILED DESCRIPTION OF EXAMPLE EMBODIMENTS

Figure 1A:
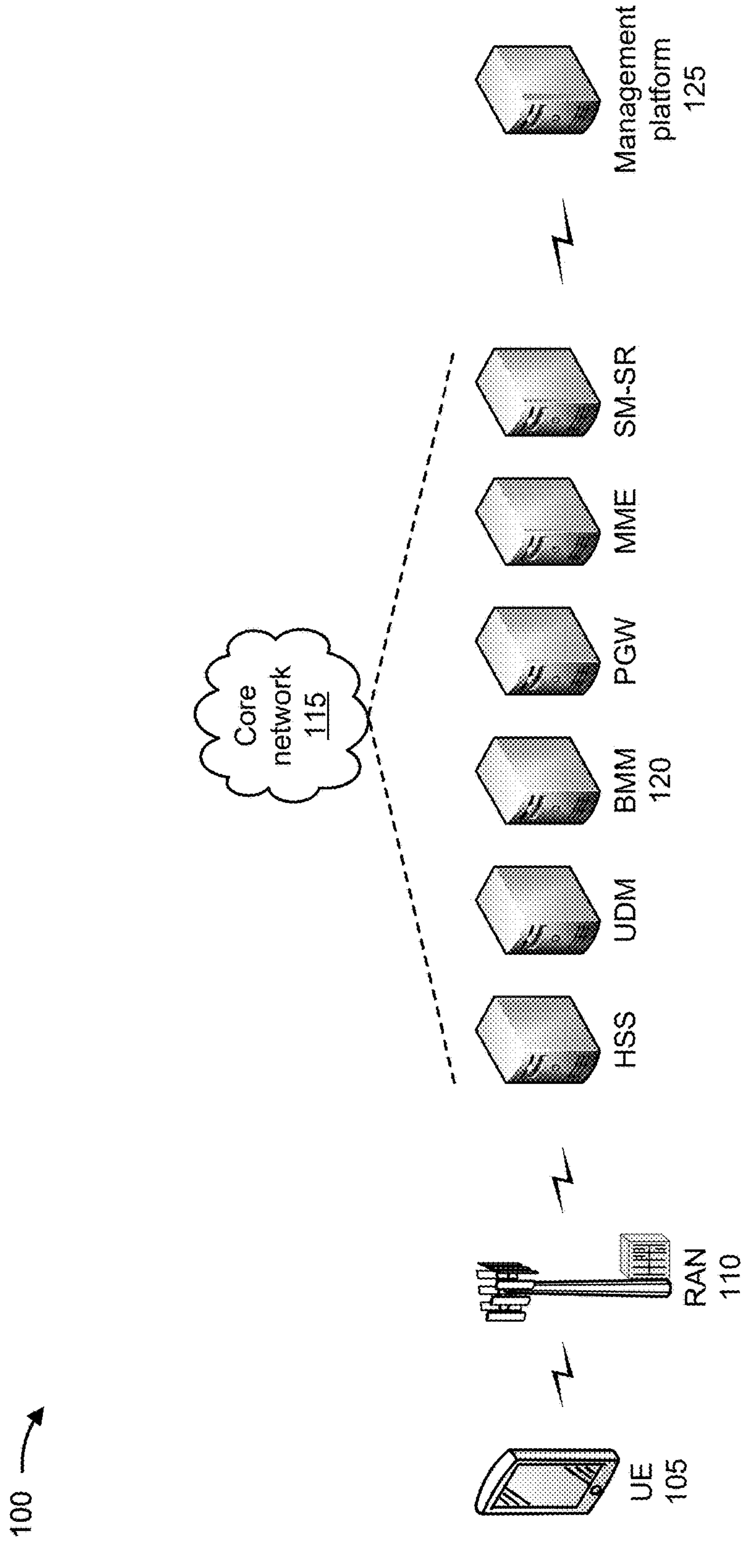
FIGS. 1A-1E are diagrams of an example associated with allocating a network identifier for a bootstrap profile of a user equipment.

The following detailed description of example implementations refers to the accompanying drawings. The same reference numbers in different drawings may identify the same or similar elements.

A bootstrap profile is used for a short period of time. A bootstrap profile enables a UE to download, activate and enable an operational profile. Once the operational profile is activated and enabled the bootstrap profile is disabled on the UE. Once disabled, the bootstrap profile will only be used in specific rare circumstances, (e.g., if the operational profile fails or the UE is reset to clear the operational profile). In certain circumstances, the bootstrap profile requires a network identifier (e.g., a mobile station international subscriber directory number (MSISDN)) to be allocated in order for network services to reach the bootstrap profile and wake up the UE or for the UE to receive download updates. A network maintains an active bootstrap profile for the UE for a life of the UE so that the network can service the bootstrap profile at any time. This means that the MSISDN remains allocated to the bootstrap profile for the entire life of the UE. However, MSISDNs are finite resources and allocating MSISDNs for long periods of time (e.g., one year, two years, and/or the like) for bootstrap profile purposes is wasteful and costly for network operators.

Thus, current techniques for allocating network identifiers with bootstrap profiles consume computing resources (e.g., processing resources, memory resources, communication resources, and/or the like), networking resources, and/or other resources associated with the maintaining network identifiers for UEs for long periods of time even when the UEs fail to utilize the network identifiers, allocating network identifiers for UEs that fail to utilize the network identifiers, managing the allocation of network identifiers to UEs, and/or the like.

Some implementations described herein provide a device (e.g., a bootstrap MSISDN manager (BMM)) that allocates a network identifier for a bootstrap profile of a UE. For example, the BMM may store a plurality of network identifiers associated with a network, and may allocate, from the plurality of network identifiers, a network identifier to a bootstrap profile of a UE upon detection of an attachment of the UE to the network. The BMM may update a network device (e.g., a home subscriber server (HSS) or a unified data management (UDM) system) of the network with the allocated network identifier for the bootstrap profile, and may initiate transmission of the allocated network identifier to the UE. The BMM may quarantine the network identifier associated with the bootstrap profile based on the bootstrap profile being disabled.

In this way, the BMM allocates a network identifier for a bootstrap profile of a user equipment. For example, the BMM may dynamically allocate and deallocate network identifiers (e.g., MSISDNs) to active bootstrap profiles in UEs. The BMM may interface with a home subscriber server (HSS) or a unified data management (UDM) system of a network, may communicate with subscription management devices of the network, and may handle requests for bootstrap profile management. The BMM may improve network efficiency by conserving MSISDNs (e.g., by only allocating them when required) and by facilitating real-time availability checks and status updates for MSISDNs. The BMM may reduce the burden of maintaining inactive MSISDNs, and may optimize utilization of MSISDN resources. Thus, the BMM may conserve computing resources, networking resources, and/or other resources that would have otherwise been consumed by the maintaining network identifiers for UEs for long periods of time even when the UEs fail to utilize the network identifiers, allocating network identifiers for UEs that fail to utilize the network identifiers, managing the allocation of network identifiers to UEs, and/or the like.

FIGS. 1A-1E are diagrams of an example 100 associated with allocating a network identifier for a bootstrap profile of a user equipment. As shown in FIGS. 1A-1E, the example 100 includes a user equipment (UE) 105, a radio access network (RAN) 110, a core network 115, and a management platform (MP) 125. The core network 115 may include a home subscriber server (HSS), a user data management (UDM) device, a bootstrap MSISDN manager (BMM) 120, a packet data network gateway (PGW), a mobility management entity device (MME), and a subscription manager-secure routing (SM-SR) device. Further details of the UE 105, the RAN 110, the core network 115, the HSS, the UDM, the BMM 120, the PGW, the MME, the SM-SR, and the management platform 125 are provided elsewhere herein. Although implementations are described in connection with a fourth generation (4G) core network, the implementations may be utilized with other types of core networks, such as a fifth generation (5G) core network.

Figure 1B:
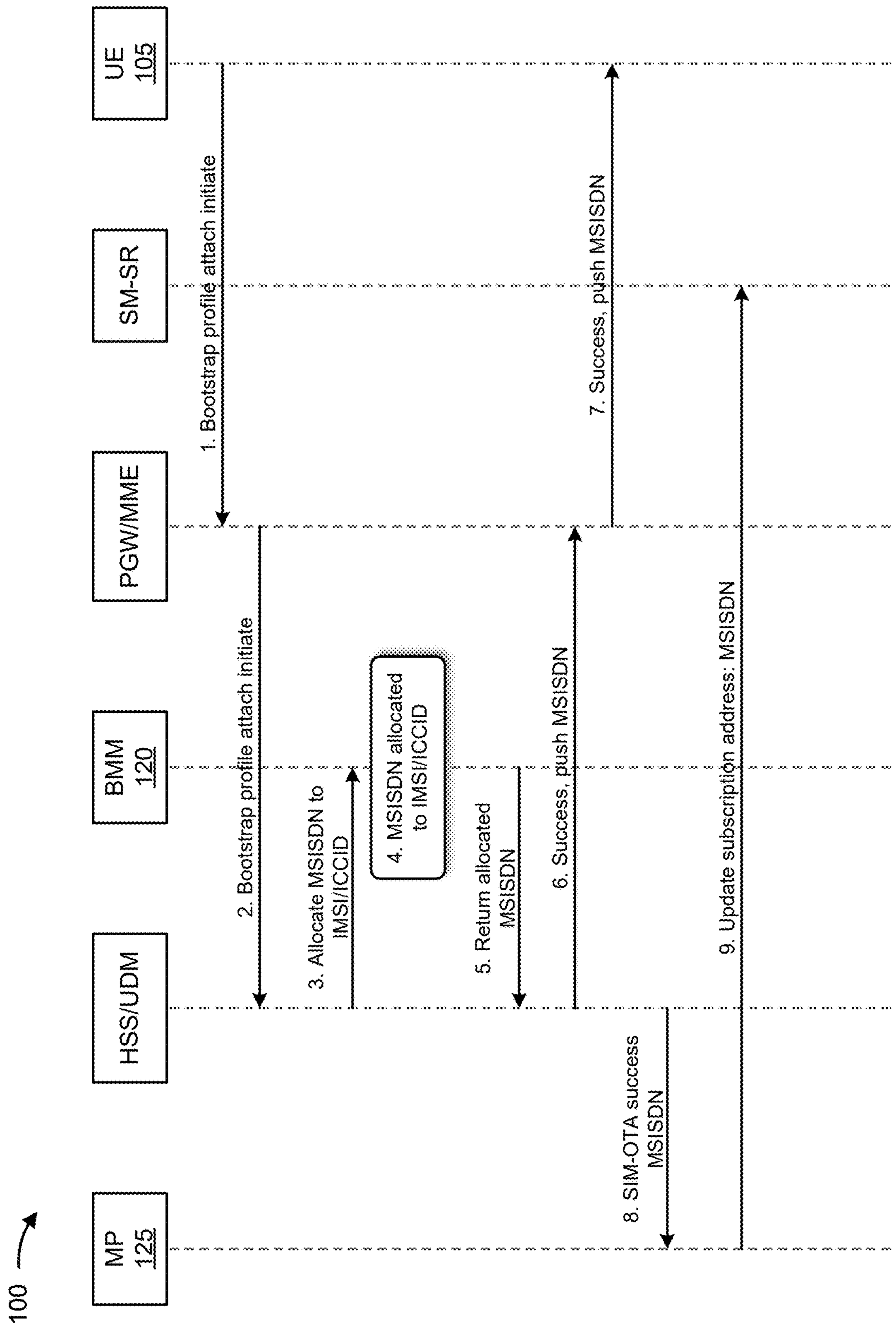

FIG. 1B is an example information flow diagram associated with activating a bootstrap profile. The BMM 120 may store a pool of network identifiers (e.g., MSISDNs), and may interface with the HSS/UDM (e.g., which stores provisioned bootstrap profiles identifying UEs 105 in the core network 115), a network subscription management component (e.g., the SM-SR which manages bootstrap profiles for UEs 105), and user application services that request bootstrap profile management (e.g., the management platform 125). A bootstrap profile may be provisioned on the HSS/UDM without an MSISDN, and may be activated without the MSISDN on the network side. The bootstrap profile may pre-provisioned on the UE 105 without the MSISDN. When the UE 105 is turned on for the first time, the UE 105 may attach to the core network 115.

As shown at step 1, the PGW/MME may receive a message indicating that the UE 105 is utilizing the bootstrap profile to attach to the core network 115. For example, when the UE 105 attaches to the core network 115, the UE 105 may generate the message and may provide the message to the PGW/MME. As shown at step 2, the PGW/MME may provide, to the HSS/UDM, the message indicating that the UE 105 is utilizing the bootstrap profile to attach to the core network 115. As shown at step 3, upon detection of the attachment of UE 105 to the core network 115 (e.g., based on receipt of the message), the HSS/UDM may determine that bootstrap profile of the UE 105 is active, and provide, to the BMM 120, a message indicating that the bootstrap profile of the UE 105 is active and requesting allocation of a network identifier (e.g., an MSISDN) for the bootstrap profile.

As shown at step 4 of FIG. 1B, based on the message requesting allocation of a network identifier for the bootstrap profile, the BMM 120 may allocate an MSISDN from a pool of MSISDNs that are managed by the BMM 120. The BMM 120 may associate the MSISDN with the bootstrap profile (e.g., with an international mobile subscriber identity (IMSI) or an integrated circuit card identification (ICCID) of a processing component of the UE 105 that stores the bootstrap profile). Allocation of the network identifier to the bootstrap profile may facilitate provision of over-the-air (OTA) updates to the UE 105, waking up the UE 105, and/or the like. As shown at step 5, the BMM 120 may provide the network identifier (e.g., the MSISDN) to the HSS/UDM, and the HSS/UDM may receive the MSISDN.

As shown at step 6 of FIG. 1B, the HSS/UDM may determine that the MSISDN has been successfully allocated to the bootstrap profile, and may push the MSISDN to the core network 115 (e.g., to the PGW/MME) to ensure that the core network 115 is updated with the allocated network identifier for the bootstrap profile. As shown at step 7, the PGW/MME may push the MSISDN to the UE 105 via an OTA update provided to the UE 105. The UE 105 may receive the MSISDN, and may utilize the MSISDN to identify the bootstrap profile and to properly function while connected to the core network 115.

As shown at step 8 of FIG. 1B, once the MSISDN is provided to the UE 105, the HSS/UDM may generate a message indicating that the MSISDN has been successfully provided to the UE 105, and may provide the message to the management platform 125. As shown at step 9, when the management platform 125 receives the message indicating that the MSISDN has been successfully provided to the UE 105, the management platform 125 may provide, to the SM-SR, a message requesting that a subscription address for the bootstrap profile be updated to the MSISDN. The SM-SR is a subscription management device of the core network 115 that manages bootstrap profiles for UEs 105 connected to the core network 115. The SM-SR may update the subscription address for the bootstrap profile to the MSISDN based on the message. In this way, the SM-SR may ensure that the core network 115 may appropriately manage and communicate with the bootstrap profile of the UE 105 using the newly allocated MSISDN. Thus, the BMM 120 may provide for efficient allocation and management of network identifiers (e.g., MSISDNs) for bootstrap profiles within UEs 105, which is essential for maintaining connectivity and enabling transition between bootstrap profiles and operational profiles within the UEs 105.

Figure 1C:
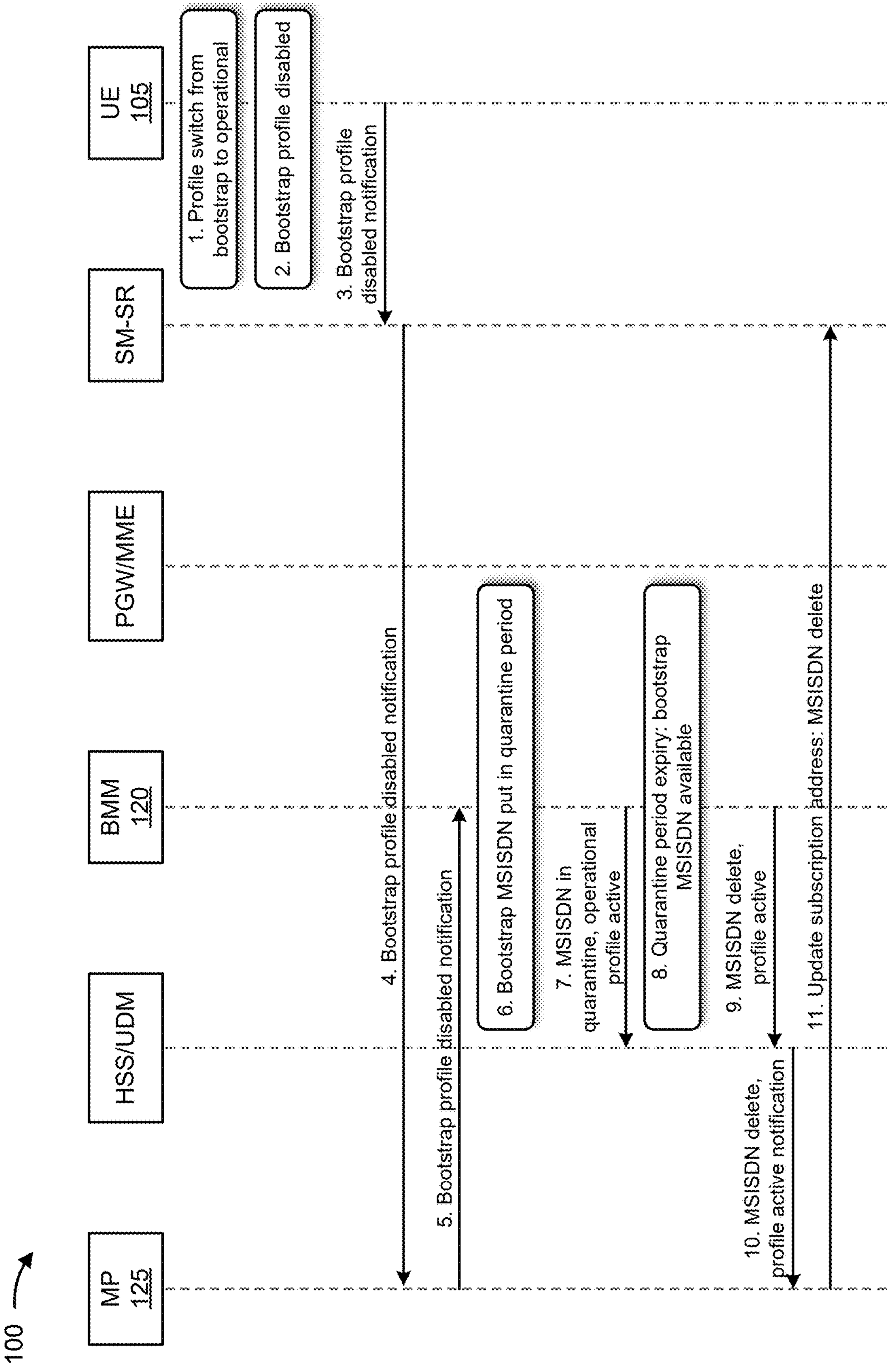

FIG. 1C is an example information flow diagram associated with disabling a bootstrap profile. As shown at step 1, the UE 105 may switch from the bootstrap profile to an operational profile once the UE 105 is configured for connection with the core network 115. As shown at step 2, the UE 105 may disable the bootstrap profile based on switching from the bootstrap profile to the operational profile since the UE 105 will not utilize the bootstrap profile. As shown at step 3, the UE 105 may generate a bootstrap profile disabled notification based on disabling the bootstrap profile, and may provide the bootstrap profile disabled notification to the SM-SR. As shown at step 4, the SM-SR may forward the bootstrap profile disabled notification to the management platform 125. As shown at step 5, the management platform 125 may forward the bootstrap profile disabled notification to the BMM 120.

As shown at step 6 of FIG. 1C, the BMM 120 may disable the bootstrap profile upon receipt of the bootstrap profile disabled notification from the management platform 125, and, upon disabling the bootstrap profile, the BMM 120 may quarantine the network identifier (e.g., the MSISDN) associated with the bootstrap profile and start a quarantine period timer for the network identifier. The BMM 120 may enter the network identifier into the quarantine state to mitigate wasteful allocation of limited network identifiers (e.g., MSISDNs). As shown at step 7, the BMM 120 may notify, the HSS/UDM, that the network identifier (e.g., the MSISDN) is in the quarantine state and that the operational profile is active in the UE 105.

As further shown in FIG. 1C, the BMM 120 may manage the state of the quarantined network identifier (e.g., the MSISDN) after the quarantine period expires. For example, the BMM 120 may determine whether the network identifier is available for reallocation or deletion from the bootstrap profile associated with the UE 105. As shown at step 8, when the quarantine period expires, the BMM 120 may transition the network identifier state to available, enabling the reallocation of the network identifier to another bootstrap profile, thus effectively conserving network identifiers.

As shown at step 9 of FIG. 1C, the BMM 120 may delete the network identifier from the bootstrap profile, and may generate a notification indicating that the network identifier is deleted from the bootstrap profile and that the operational profile is active in the UE 105. The BMM 120 may provide the notification to the HSS/UDM. As shown at step 10, the HSS/UDM may provide, to the management platform 125, the notification indicating that the network identifier is deleted from the bootstrap profile and that the operational profile is active in the UE 105. As shown at step 11, based on the notification indicating that the network identifier is deleted from the bootstrap profile and that the operational profile is active in the UE 105, the management platform 125 may generate an update subscription address notification indicating that the network identifier is deleted for the bootstrap profile, and may provide the update subscription address notification to the SM-SR.

In some implementations, if the UE 105 subsequently reenables the previously disabled bootstrap profile, the BMM 120 may provide a network identifier to the reactivated bootstrap profile. The BMM 120 may allocate either the same network identifier (e.g., the MSISDN) if the network identifier is still available or a new network identifier, which may ensure continued operation of the UE 105 with minimal interruption. The BMM 120 may continuously update the network devices of the core network 115 (e.g., the HSS/UDM) with the status of the quarantine or reallocation of the network identifier in order to maintain accurate network records and enhance an operational efficiency of the core network 115.

Figure 1D:
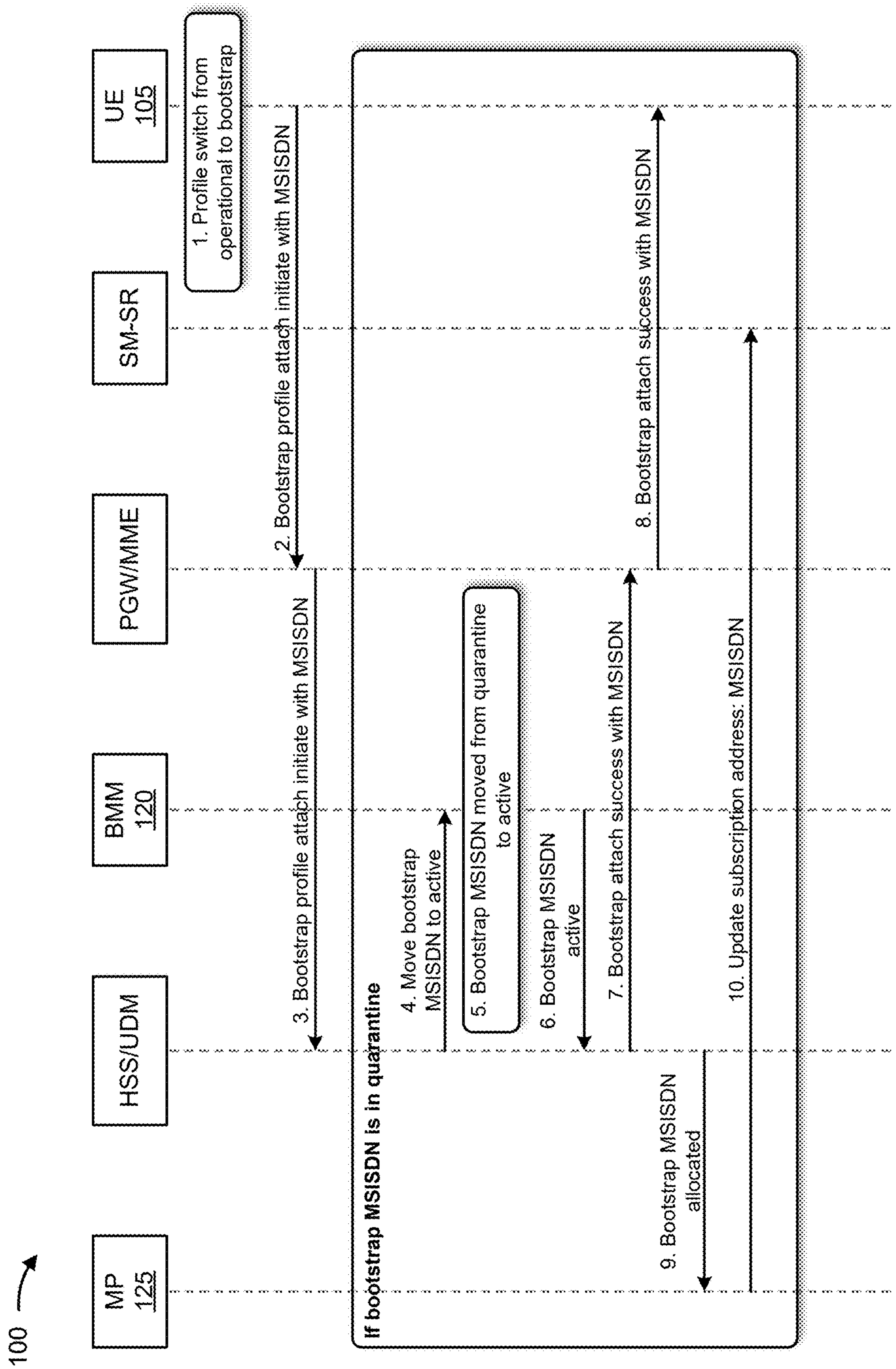
Figure 1E:
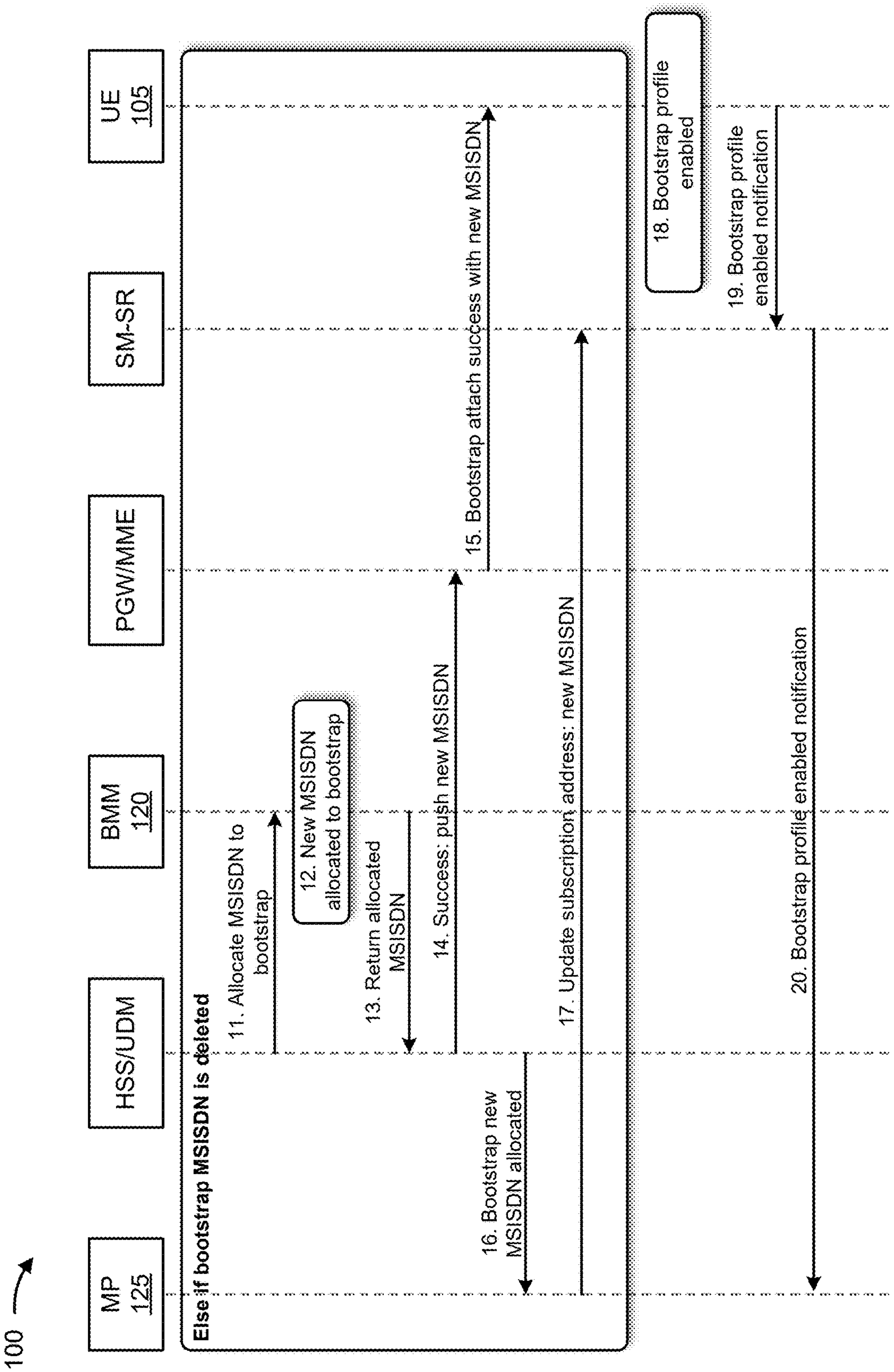

FIGS. 1D and 1E depict an example information flow diagram associated with reenabling a bootstrap profile. FIG. 1D depicts information flows associated with reenabling a bootstrap profile when the network identifier (e.g., the MSISDN) associated with the bootstrap profile is in quarantine. FIG. 1E depicts information flows associated with reenabling a bootstrap profile when the network identifier (e.g., the MSISDN) associated with the bootstrap profile is deleted (e.g., unavailable).

As shown at step 1 of FIG. 1D, the UE 105 may switch from the operational profile to the bootstrap profile and may attach to the core network 115. As shown at step 2, the PGW/MME may receive a message indicating that the UE 105 is utilizing the bootstrap profile and the network identifier (e.g., the MSISDN) to attach to the core network 115. For example, when the UE 105 attaches to the core network 115, the UE 105 may generate the message and may provide the message to the PGW/MME. As shown at step 3, the PGW/MME may provide, to the HSS/UDM, the message indicating that the UE 105 is utilizing the bootstrap profile and the network identifier to attach to the core network 115. As shown at step 4, upon detection of the attachment of UE 105 to the core network 115 (e.g., based on receipt of the message), the HSS/UDM may determine that bootstrap profile of the UE 105 is active, and provide, to the BMM 120, a message indicating that the bootstrap profile of the UE 105 is active and requesting that the network identifier (e.g., an MSISDN) for the bootstrap profile be moved from the quarantine state to an active state.

As shown at step 5 of FIG. 1D, the BMM 120 may transition the network identifier from the quarantine state to the active state. This transition may be prompted when the bootstrap profile is determined to be active again after being deactivated, in which case the BMM 120 may reallocate the previously quarantined network identifier to the bootstrap profile. As shown at step 6, the BMM 120 may provide, to the HSS/UDM, a notification indicating that the network identifier (e.g., the MSISDN) is active for the bootstrap profile. As shown at step 7, the HSS/UDM may determine that the bootstrap profile has been successfully attached to the core network 115 with the network identifier, and provide, to the core network 115 (e.g., to the PGW/MME), a notification indicating that the bootstrap profile has successfully attached with the network identifier to ensure that the core network 115 is updated with the allocated network identifier for the bootstrap profile. As shown at step 7, the PGW/MME may provide, to the UE 105, the notification indicating that the bootstrap profile has successfully attached with the network identifier (e.g., via a secure OTA update provided to the UE 105). The UE 105 may receive the MSISDN, and may utilize the MSISDN to identify the bootstrap profile and to properly function while connected to the core network 115.

As shown at step 9 of FIG. 1D, once the MSISDN is provided to the UE 105, the HSS/UDM may generate a message indicating that the MSISDN has been successfully allocated to the bootstrap profile, and may provide the message to the management platform 125. As shown at step 10, when the management platform 125 receives the message indicating that the MSISDN has been successfully allocated to the bootstrap profile, the management platform 125 may provide, to the SM-SR, a message requesting that a subscription address for the bootstrap profile be updated to the MSISDN. The SM-SR may update the subscription address for the bootstrap profile to the MSISDN based on the message. In this way, the SM-SR may ensure that the core network 115 may appropriately manage and communicate with the bootstrap profile of the UE 105 using the MSISDN. Thus, the BMM 120 may provide for efficient allocation and management of network identifiers (e.g., MSISDNs) for bootstrap profiles within UEs 105, which is essential for maintaining connectivity and enabling transition between bootstrap profiles and operational profiles within the UEs 105.

As shown a step 11 of FIG. 1E, when the network identifier previously allocated to the bootstrap profile is unavailable, the HSS/UDM may generate a request for allocation of the network identifier (e.g., MSISDN) for the bootstrap profile, and may provide the request to the BMM 120. As shown at step 12, based on the request for allocation of the network identifier, the BMM 120 may allocates a new network identifier (e.g., a new MSISDN) for the bootstrap profile when the previously allocated network identifier MSISDN is unavailable. In some implementations, the new network identifier may be selected from the pool of network identifiers maintained by the BMM 120. As shown at step 13, the BMM 120 may provide the new network identifier to the HSS/UDM.

As shown at step 14 of FIG. 1E, the HSS/UDM may determine that the new MSISDN has been successfully allocated to the bootstrap profile, and may push the new MSISDN to the core network 115 (e.g., to the PGW/MME) to ensure that the core network 115 is updated with the allocated new network identifier for the bootstrap profile. As shown at step 15, the PGW/MME may push the new MSISDN to the UE 105 via a secure OTA update provided to the UE 105. The UE 105 may receive the new MSISDN, and may utilize the new MSISDN to identify the bootstrap profile and to properly function while connected to the core network 115.

As shown at step 16 of FIG. 1E, once the new MSISDN is provided to the UE 105, the HSS/UDM may generate a message indicating that the new MSISDN has been successfully provided to the UE 105, and may provide the message to the management platform 125. As shown at step 17, when the management platform 125 receives the message indicating that the new MSISDN has been successfully provided to the UE 105, the management platform 125 may provide, to the SM-SR, a message requesting that a subscription address for the bootstrap profile be updated to the new MSISDN. The SM-SR may update the subscription address for the bootstrap profile to the new MSISDN based on the message. In this way, the SM-SR may ensure that the core network 115 may appropriately manage and communicate with the bootstrap profile of the UE 105 using the newly allocated MSISDN.

As shown at step 18 of FIG. 1E, the UE 105 may enable the bootstrap profile based on the new MSISDN, and may utilize the bootstrap profile to interact with the core network 115. As shown at step 19, after enabling the bootstrap profile, the UE 105 may generate a bootstrap profile enabled notification, and may provide the bootstrap profile enabled notification to the SM-SR. As show at step 20, the SM-SR may provide the bootstrap profile enabled notification to the management platform 125.

In this way, the BMM 120 allocates a network identifier for a bootstrap profile of a UE 105. For example, the BMM 120 may dynamically allocate and deallocate network identifiers (e.g., MSISDNs) to active bootstrap profiles in UEs 105. The BMM 120 may interface with an HSS or a UDM system of a network, may communicate with subscription management devices of the network, and may handle requests for bootstrap profile management. The BMM 120 may improve network efficiency by conserving MSISDNs (e.g., by only allocating them when required) and by facilitating real-time availability checks and status updates for MSISDNs. The BMM 120 may reduce the burden of maintaining inactive MSISDNs, and may optimize utilization of MSISDN resources. Thus, the BMM 120 may conserve computing resources, networking resources, and/or other resources that would have otherwise been consumed by the maintaining network identifiers for UEs 105 for long periods of time even when the UEs 105 fail to utilize the network identifiers, allocating network identifiers for UEs 105 that fail to utilize the network identifiers, managing the allocation of network identifiers to UEs 105, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
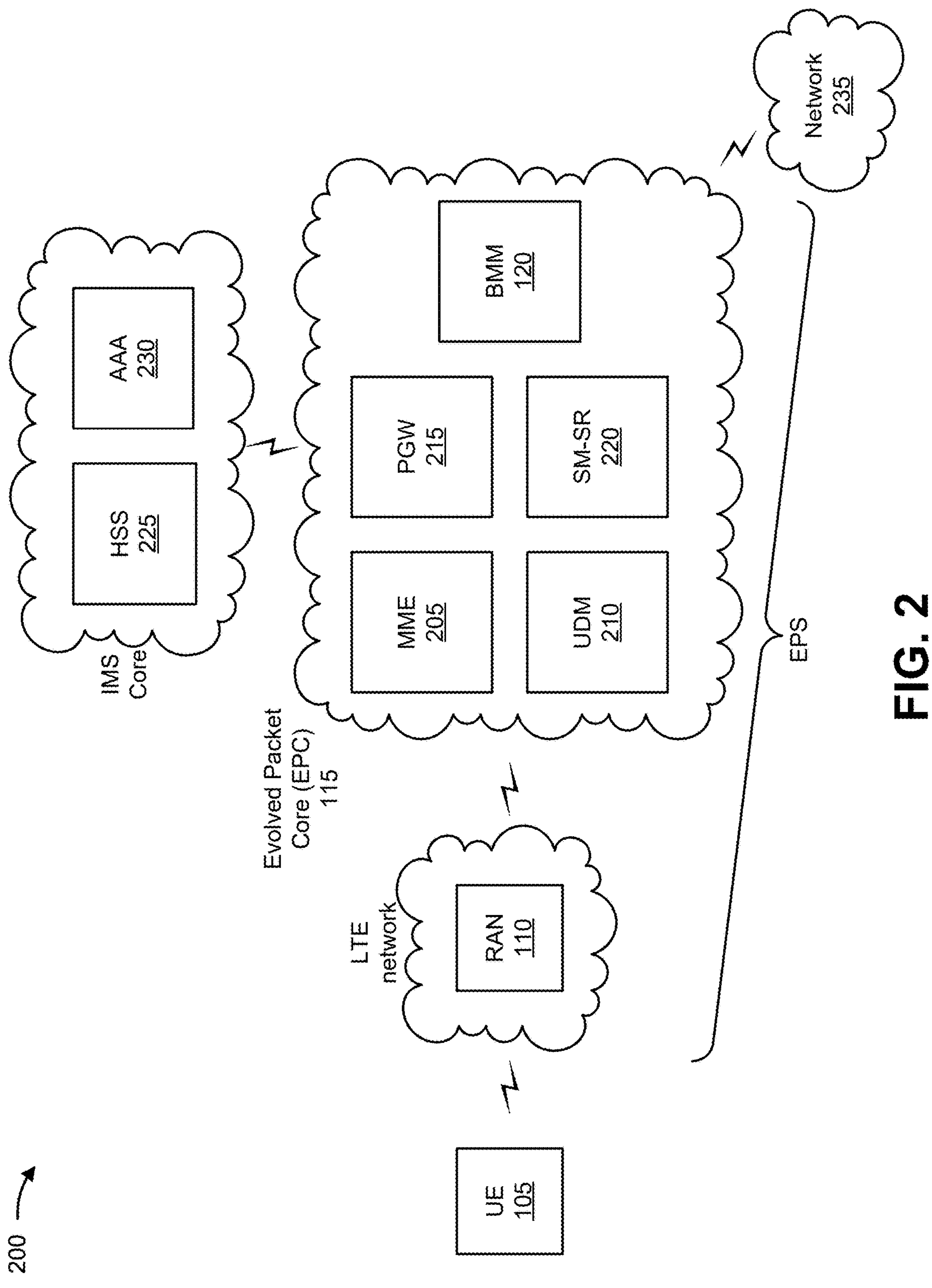
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the UE 105, the RAN 110, the core network 115, an Internet protocol (IP) multimedia subsystem (IMS) core, and a network 235. The core network 115 may include the BMM 120, an MME 205, a UDM 210, a PGW 215, and an SM-SR 220. The IMS core may include an HSS 225 and an AAA 230. Devices of the environment 200 may interconnect via wired connections, wireless connections, or a combination of wired and wireless connections. Some implementations are described herein as being performed within a Long-Term Evolution (LTE) network for explanatory purposes. Some implementations may be performed within a network that is not an LTE network, such as a third generation (3G) network or a 5G network.

The environment 200 may include an evolved packet system (EPS) that includes an LTE network (e.g., the RAN 110) and/or an evolved packet core (EPC) (e.g., the core network 115) that operate based on a third-generation partnership project (3GPP) wireless communication standard. The LTE network may include one or more RANs 110 that take the form of evolved Node Bs (eNBs) via which the UE 105 communicates with the EPC. The EPC may enable the UE 105 to communicate with the network 235 and/or the IMS core. The IMS core may manage device registration and authentication, session initiation, and/or other operations associated with UEs 105. The HSS 225 and/or the AAA 230 may reside in the EPC and/or the IMS core.

The UE 105 includes one or more devices capable of receiving, generating, storing, processing, and/or providing information, such as information described herein. For example, the UE 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 105. The RAN 110 may transfer traffic between the UE 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the UE 105 covered by the RAN 110 (e.g., the UE 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the UE 105 covered by the RAN 110).

The BMM 120 may include one or more devices capable of receiving, generating, storing, processing, providing, and/or routing information, as described elsewhere herein. The BMM 120 may include a communication device and/or a computing device. For example, the BMM 120 may include a server, such as an application server, a client server, a web server, a database server, a host server, a proxy server, a virtual server (e.g., executing on computing hardware), or a server in a cloud computing system. In some implementations, the BMM 120 may include computing hardware used in a cloud computing environment.

The MME 205 includes one or more devices, such as one or more server devices, capable of managing authentication, activation, deactivation, and/or mobility functions associated with the UE 105. In some implementations, the MME 205 may perform operations relating to authentication of the UE 105. Additionally, or alternatively, the MME 205 may facilitate the selection of a particular PGW to provide traffic to and/or from the UE 105. The MME 205 may perform operations associated with handing off the UE 105 from a first RAN 110 to a second RAN 110 when the UE 105 is transitioning from a first cell associated with the first RAN 110 to a second cell associated with the second RAN 110. Additionally, or alternatively, the MME 205 may select another MME (not pictured), to which the UE 105 should be handed off (e.g., when the UE 105 moves out of range of MME 205).

The UDM 210 includes one or more devices capable of managing network user data (e.g., associated with the UE 105) in a single, centralized element. The UDM 210 may be paired with a user data repository (UDR) that stores user data, such as customer profile information, customer authentication information, and encryption keys for the information. The UDM 210 may reside on the control plane and may utilize microservices to communicate between the user plane and the control plane.

The PGW 215 includes one or more devices capable of providing connectivity for the UE 105 to external packet data networks (e.g., other than the depicted EPC and/or LTE network). For example, the PGW 215 may include one or more data processing and/or traffic transfer devices, such as a gateway, a router, a modem, a switch, a firewall, a network interface card (NIC), a hub, a bridge, a server device, an optical add-drop multiplexer (OADM), or any other type of device that processes and/or transfers traffic. In some implementations, the PGW 215 may aggregate traffic, and may send the aggregated traffic to the network 235. Additionally, or alternatively, the PGW 215 may receive traffic from network 235, and may send the traffic to the UE 105 via the RAN 110. The PGW 215 may record data usage information (e.g., byte usage), and may provide the data usage information to the AAA 230.

The SM-SR 220 includes one or more devices capable of securely delivering encrypted operator credentials to a SIM. Once the operator credentials are installed (e.g., on the UE 105), the SM-SR 220 may remotely manage the SIM thereafter (e.g., by enabling, disabling, or deleting the operator credentials as necessary). The SM-SR 220 may ensure secure transport of an eUICC platform and eUICC profile management commands in order to load, enable, disable, or delete profiles on the eUICC of the SIM.

The HSS 225 includes one or more devices, such as one or more server devices, capable of managing (e.g., receiving, generating, storing, processing, and/or providing) information associated with the UE 105. For example, the HSS 225 may manage subscription information associated with the UE 105, such as information that identifies a subscriber profile of a user associated with the UE 105, information that identifies services and/or applications that are accessible to the UE 105, location information associated with the UE 105, a network identifier (e.g., a network address) that identifies the UE 105, information that identifies a treatment of the UE 105 (e.g., quality of service information, a quantity of minutes allowed per time period, a quantity of data consumption allowed per time period, etc.), and/or similar information. The HSS 225 may provide this information to one or more other devices of the environment 200 to support the operations performed by those devices.

The AAA 230 includes one or more devices, such as one or more server devices, that perform authentication, authorization, and/or accounting operations for communication sessions associated with the UE 105. For example, the AAA 230 may perform authentication operations for the UE 105 and/or a user of the UE 105 (e.g., using one or more credentials), may control access, by the UE 105, to a service and/or an application (e.g., based on one or more restrictions, such as time-of-day restrictions, location restrictions, single or multiple access restrictions, read/write restrictions, etc.), may track resources consumed by the UE 105 (e.g., a quantity of voice minutes consumed, a quantity of data consumed, etc.), and/or may perform similar operations.

The network 235 includes one or more wired and/or wireless networks. For example, the network 235 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
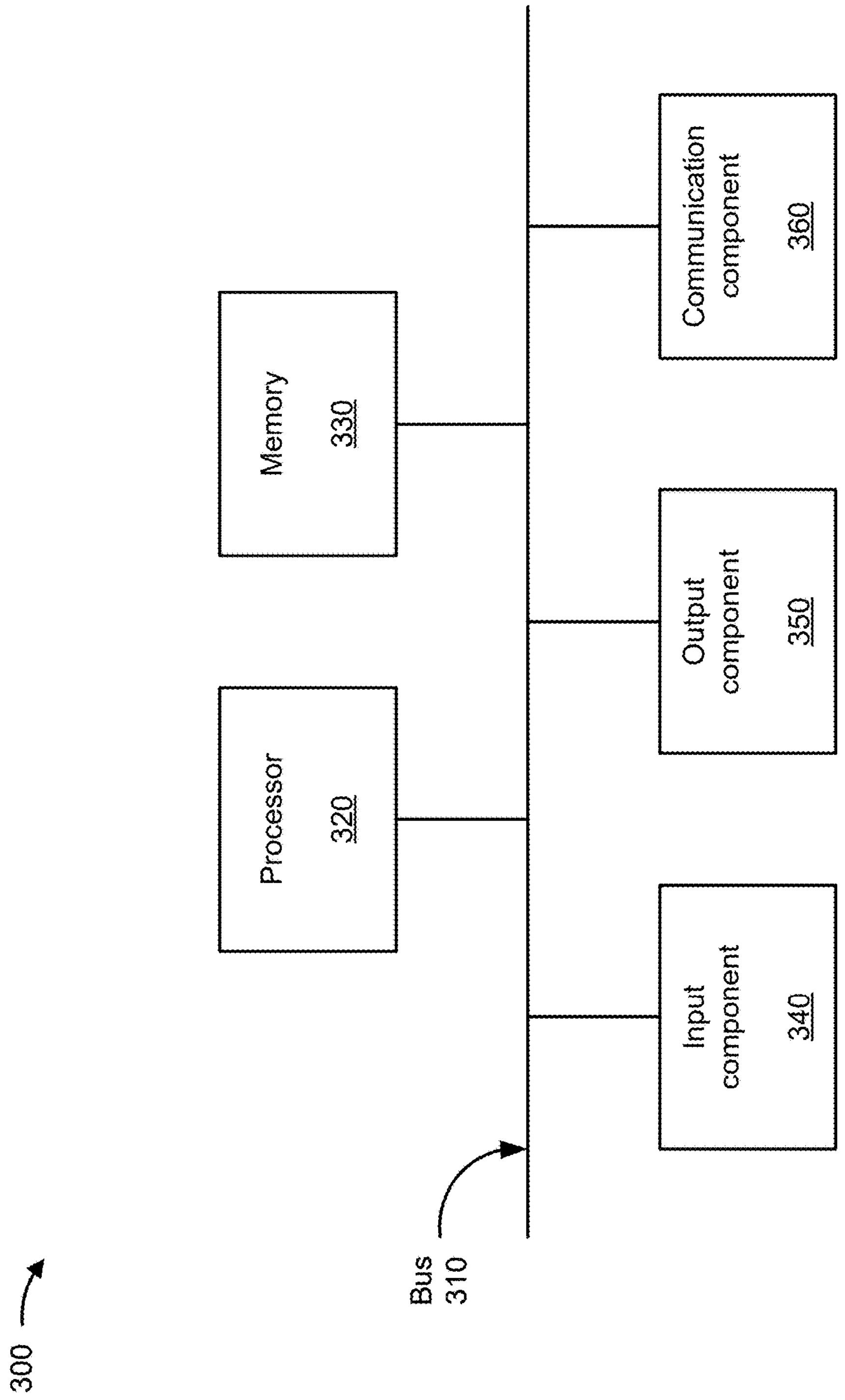
FIG. 3 is a diagram of example components of one or more devices of FIG. 2.

FIG. 3 is a diagram of example components of a device 300, which may correspond to the UE 105, the RAN 110, the BMM 120, the MME 205, the UDM 210, the PGW 215, the SM-SR 220, the HSS 225, and/or the AAA 230. In some implementations, the UE 105, the RAN 110, the BMM 120, the MME 205, the UDM 210, the PGW 215, the SM-SR 220, the HSS 225, and/or the AAA 230 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
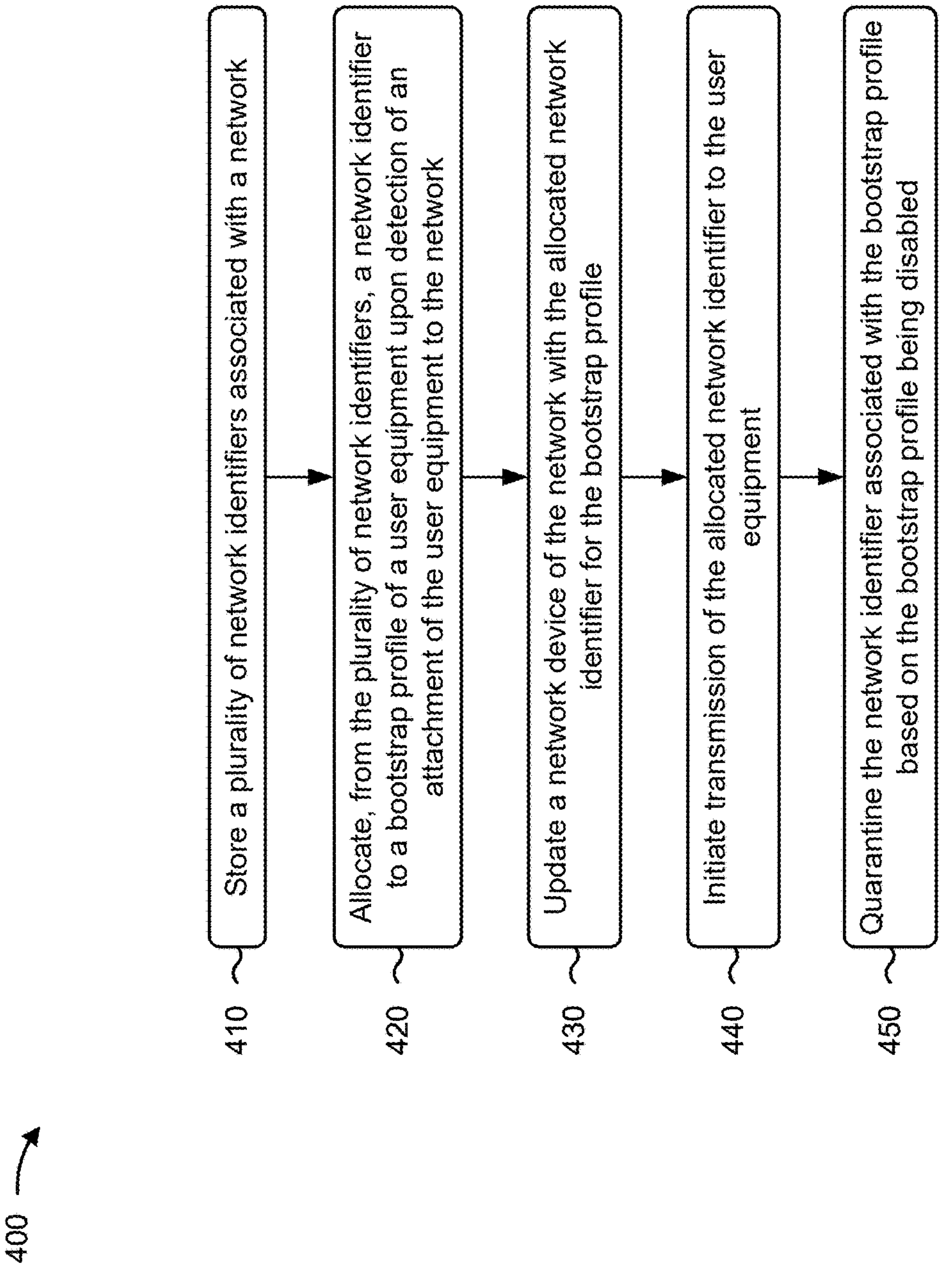
FIG. 4 is a flowchart of an example process for allocating a network identifier for a bootstrap profile of a user equipment.

FIG. 4 is a flowchart of an example process 400 for allocating a network identifier for a bootstrap profile of a user equipment. In some implementations, one or more process blocks of FIG. 4 may be performed by a device (e.g., the BMM 120). In some implementations, one or more process blocks of FIG. 4 may be performed by another device or a group of devices separate from or including the device, such as a UE (e.g., the UE 105). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include storing a plurality of network identifiers associated with a network (block 410). For example, the device may store a plurality of network identifiers associated with a network, as described above.

As further shown in FIG. 4, process 400 may include allocating, from the plurality of network identifiers, a network identifier to a bootstrap profile of a UE upon detection of an attachment of the UE to the network (block 420). For example, the device may allocate, from the plurality of network identifiers, a network identifier to a bootstrap profile of a UE upon detection of an attachment of the UE to the network, as described above. In some implementations, the network identifier is an MSISDN.

As further shown in FIG. 4, process 400 may include updating a network device of the network with the allocated network identifier for the bootstrap profile (block 430). For example, the device may update a network device of the network with the allocated network identifier for the bootstrap profile, as described above. In some implementations, updating the network device with the allocated network identifier for the bootstrap profile includes removing the network identifier from the bootstrap profile after a quarantine period, or updating a status of the bootstrap profile to active.

As further shown in FIG. 4, process 400 may include initiating transmission of the allocated network identifier to the UE (block 440). For example, the device may initiate transmission of the allocated network identifier to the UE, as described above. In some implementations, the transmission of the allocated network identifier to the user equipment is an over-the-air transmission.

As further shown in FIG. 4, process 400 may include quarantining the network identifier associated with the bootstrap profile based on the bootstrap profile being disabled (block 450). For example, the device may quarantine the network identifier associated with the bootstrap profile based on the bootstrap profile being disabled, as described above. In some implementations, quarantining the network identifier associated with the bootstrap profile includes receiving an indication that the bootstrap profile is disabled, and quarantining the network identifier associated with the bootstrap profile based on the indication that the bootstrap profile is disabled.

In some implementations, process 400 includes determining that a quarantine period has expired, and rendering the quarantined network identifier available for reallocation based on expiration of the quarantine period. In some implementations, process 400 includes determining that a quarantine period has expired and that the network identifier is not available, and allocating a new network identifier to the bootstrap profile based on determining that the quarantine period has expired and that the network identifier is not available. In some implementations, process 400 includes determining that a quarantine period has expired and that the network identifier is available, and reallocating the network identifier to the bootstrap profile based on determining that the quarantine period has expired and that the network identifier is available.

In some implementations, process 400 includes notifying a subscription management device of the allocated network identifier for the bootstrap profile. In some implementations, process 400 includes determining that the bootstrap profile is deactivated, determining that the bootstrap profile is active again after being deactivated, and reallocating the network identifier or a new network identifier to the bootstrap profile based on the bootstrap profile becoming active again.

In some implementations, process 400 includes receiving a notification indicating that the bootstrap profile is disabled, and entering the network identifier into a quarantine state based on the notification. In some implementations, process 400 includes removing the allocated network identifier for the bootstrap profile from the network device based on entering the network identifier into the quarantine state. In some implementations, process 400 includes transitioning the network identifier from the quarantine state to an available state after a quarantine period expires, and reallocating the network identifier to the bootstrap profile based on transitioning the network identifier from the quarantine state to the available state.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
- storing, by a device, a plurality of network identifiers associated with a network;
- allocating, by the device and from the plurality of network identifiers, a network identifier to a bootstrap profile of a user equipment upon detection of an attachment of the user equipment to the network;
- updating, by the device, a network device of the network with the allocated network identifier for the bootstrap profile;
- initiating, by the device, transmission of the allocated network identifier to the user equipment; and
- quarantining, by the device, the allocated network identifier associated with the bootstrap profile based on the bootstrap profile being disabled.

2. The method of claim 1, wherein quarantining the network identifier associated with the bootstrap profile comprises:
- receiving an indication that the bootstrap profile is disabled; and
- quarantining the network identifier associated with the bootstrap profile based on the indication that the bootstrap profile is disabled.

3. The method of claim 2, further comprising:
- determining that a quarantine period has expired; and
- rendering the quarantined network identifier available for reallocation based on expiration of the quarantine period.

4. The method of claim 2, further comprising:
- determining that a quarantine period has expired and that the network identifier is not available; and
- allocating a new network identifier to the bootstrap profile based on determining that the quarantine period has expired and that the network identifier is not available.

5. The method of claim 2, further comprising:
- determining that a quarantine period has expired and that the network identifier is available; and
- reallocating the network identifier to the bootstrap profile based on determining that the quarantine period has expired and that the network identifier is available.

6. The method of claim 1, wherein the transmission of the allocated network identifier to the user equipment is an over-the-air transmission.

7. The method of claim 1, further comprising:
- notifying a subscription management device of the allocated network identifier for the bootstrap profile.

8. A device, comprising:
- one or more processors configured to:
  - store a plurality of network identifiers associated with a network;
  - allocate, from the plurality of network identifiers, a network identifier to a bootstrap profile of a user equipment upon detection of an attachment of the user equipment to the network,
    - wherein the bootstrap profile includes a default connectivity configuration for connecting the user equipment with the network;
  - update a network device of the network with the allocated network identifier for the bootstrap profile; and
  - initiate transmission of the allocated network identifier to the user equipment.

9. The device of claim 8, wherein the one or more processors, to update the network device with the allocated network identifier for the bootstrap profile, are configured to:

remove the network identifier from the bootstrap profile after a quarantine period; or update a status of the bootstrap profile to active.

10. The device of claim 8, wherein the one or more processors are further configured to:

determine that the bootstrap profile is deactivated;

determine that the bootstrap profile is active again after being deactivated; and reallocate the network identifier or a new network identifier to the bootstrap profile based on the bootstrap profile becoming active again.

11. The device of claim 8, wherein the one or more processors are further configured to:

receive a notification indicating that the bootstrap profile is disabled; and enter the network identifier into a quarantine state based on the notification.

12. The device of claim 11, wherein the one or more processors are further configured to:

remove the allocated network identifier for the bootstrap profile from the network device based on entering the network identifier into the quarantine state.

13. The device of claim 11, wherein the one or more processors are further configured to:

transition the network identifier from the quarantine state to an available state after a quarantine period expires; and reallocate the network identifier to the bootstrap profile based on transitioning the network identifier from the quarantine state to the available state.

14. The device of claim 8, wherein the network identifier is a mobile station international subscriber directory number.

15. A non-transitory computer-readable medium storing a set of instructions, the set of instructions comprising:

one or more instructions that, when executed by one or more processors of a device, cause the device to:

store a plurality of network identifiers associated with a network;

allocate, from the plurality of network identifiers, a network identifier to a bootstrap profile of a user equipment upon detection of an attachment of the user equipment to the network;

update a network device of the network with the allocated network identifier for the bootstrap profile;

initiate transmission of the allocated network identifier to the user equipment;

receive an indication that the bootstrap profile is disabled; and quarantine the network identifier associated with the bootstrap profile based on the indication that the bootstrap profile is disabled.

16. The non-transitory computer-readable medium of claim 15, wherein the one or more instructions further cause the device to:

determine that a quarantine period has expired; and render the quarantined network identifier available for reallocation based on expiration of the quarantine period.

17. The non-transitory computer-readable medium of claim 15, wherein the one or more instructions further cause the device to:

determine that a quarantine period has expired and that the network identifier is not available; and allocate a new network identifier to the bootstrap profile based on determining that the quarantine period has expired and that the network identifier is not available.

18. The non-transitory computer-readable medium of claim 15, wherein the one or more instructions further cause the device to:

determine that a quarantine period has expired and that the network identifier is available; and reallocate the network identifier to the bootstrap profile based on determining that the quarantine period has expired and that the network identifier is available.

19. The non-transitory computer-readable medium of claim 15, wherein the transmission of the allocated network identifier to the user equipment is an over-the-air transmission.

20. The non-transitory computer-readable medium of claim 15, wherein the one or more instructions further cause the device to:

notify a subscription management device of the allocated network identifier for the bootstrap profile.

* * * * *